United States Patent
Szor

(10) Patent No.: US 7,287,283 B1
(45) Date of Patent: Oct. 23, 2007

(54) RETURN-TO-LIBC ATTACK BLOCKING SYSTEM AND METHOD

(75) Inventor: Peter Szor, Northridge, CA (US)

(73) Assignee: Symantec Corporation, Cupertino, CA (US)

(*) Notice: Subject to any disclaimer, the term of this patent is extended or adjusted under 35 U.S.C. 154(b) by 834 days.

(21) Appl. No.: 10/671,202

(22) Filed: Sep. 25, 2003

(51) Int. Cl.
*H04L 9/00* (2006.01)

(52) U.S. Cl. .......................... 726/26; 726/22; 726/23; 726/24; 713/165; 713/167; 713/188

(58) Field of Classification Search ...................... None
See application file for complete search history.

(56) References Cited

U.S. PATENT DOCUMENTS

| | | | |
|---|---|---|---|
| 5,822,517 A | 10/1998 | Dotan | 395/186 |
| 6,301,699 B1 | 10/2001 | Hollander et al. | 717/4 |
| 6,412,071 B1 * | 6/2002 | Hollander et al. | 726/23 |

OTHER PUBLICATIONS

Baratloo, A., et al, 'Transparent Run-Time Defense Against Stack Smashing Attacks', 2000 Proceedings of the USENIX Annual Technical Conference, entire document, http://citeseer.ist.psu.edu/cache/papers/cs/24655/http:zSzzSzwww.research.avayalabs.comzSzpprojectzSzlibsafezSzdoczSzusenix00.pdf/baratloo00transparent.pdf.*
Choi, Y., et al, 'A New Stack Buffer Overflow Hacking Defense Technique with Memory Address Confirmation', ICISC 2001: 4th International Conference Seoul, Korea, Dec. 6-7, 2001. Proceedings, pp. 146-159, http://www.springerlink.com/content/x8tn836pk6wyp8kw/fulltext.pdf.*
Larochelle, D., et al, 'Statically Detecting Likely Buffer Overflow Vulnerabilities', Hackers Digest, Iss. 2, Fall 2001, pp. 45-58, http://www.cs.virginia.edu/~evans/pubs/hd_fall_2001.pdf.*
Pedram, 'Branch Tracing with Intel MSR Registers', www.openrce.org/blog, Dec. 13, 2006, entire blog, https://www.openrce.org/blog/view/535/Branch_Tracing_with_Intel_MSR_Registers.*
Farmer, D., et al,'Forensic Discovery', Addison Wesley Professional, 2004, Chapter 6, http://www.fish2.com/forensics/pipe/chapter6.html.*
Chien, E. and Szor, P., "*Blended Attacks Exploits, Vulnerabilities and Buffer-Overflow Techniques In Computer Viruses*", Virus Bulletin Conference, Sep. 2002, Virus Bulletin Ltd., The Pentagon, Abingdon, Oxfordshire, England, pp. 1-36.
Dabak, P., Borate, M. and Phadke, S., "*Hooking Windows NT System Services*", pp. 1-8 [online]. Retrieved on Apr. 16, 2003. Retrieved from the Internet::<URL:http://www.windowsitlibrary.com/Content/356/06/2.html>.

(Continued)

*Primary Examiner*—Nasser Moazzami
*Assistant Examiner*—Ronald Baum
(74) *Attorney, Agent, or Firm*—Gunnison, McKay & Hodgson, L.L.P.; Serge J. Hodgson

(57) ABSTRACT

A method includes stalling a call to a critical operating system (OS) function, looking up a value at the previous top of stack, and determining whether the value is equivalent to an address of the critical OS function being called. If the value at the previous top of stack is equivalent to the address of the critical OS function being called, the method further includes taking protective action to protect a computer system.

21 Claims, 5 Drawing Sheets

OTHER PUBLICATIONS

"*How Entercept Protects: System Call Interception*", pp. 1-2 [online]. Retrieved on Apr. 16, 2003. Retrieved from the Internet:<URL:http://www.entercept.com/products/technology/kernelmode.asp>. No author provided.

"*How Entercept Protects: System Call Interception*", p. 1 [online]. Retrieved on Apr. 16, 2003. Retrieved from the Internet:<URL:http://www.entercept.com/products/technology/interception.asp>. No author provided.

Gordon, J., "*Understand . . . the Stack (part 1)*", pp. 1-8 [online]. Retrieved on Aug. 27, 2003. Retrieved from the Internet:<URL:http://www.jorgon.freeserve.co.uk/GoasmHelp/usstack1.htm>.

Chew, M. and Song, D., "*Mitigating Buffer Overflows by Operating System Randomization*", Dec. 2002, 9 pages.

"*Entercept Continues to Dominate the Market in Buffer Overflow Protection*", p. 1-2 [online]. Retrieved on Aug. 6, 2003. Retrieved from the Internet:<URL:http://www.entercept.com/news/uspr/07-09.02.asp>. No author provided.

"*IA-32 Intel® Architecture Software Developer's Manual; vol. 3: System Programming Guide*", pp. 15-11 to 15-22. 2002. No author provided.

Dabak, P., Borate, M., Phadke, S., *Adding New System Services to the Windows NT Kernal*, pp. 1-5 [online]. Retrieved Dec. 16, 2003. Retrieved from the Internet: URL:http://www.windowsitlibrary.com/Content/356/07/1.html.

Conover et al., U.S. Appl. No. 10/763,867, filed Jan. 22, 2004, entitled "Return-to-LIBC Attack Detection Using Branch Trace Records System and Method".

* cited by examiner

RETURN-TO-LIBC ATTACK BLOCKING SYSTEM AND METHOD

BACKGROUND OF THE INVENTION

1. Field of the Invention

The present invention relates to the protection of computer systems. More particularly, the present invention relates to a system and method of blocking Return-to-LIBC attacks.

2. Description of the Related Art

Buffer overflow techniques have been used by malicious hackers and virus writers to attack computer systems. Buffers are data storage areas, which generally hold a predefined amount of finite data. A buffer overflow occurs when a program attempts to store data into the buffer, where the data is larger than the size of the buffer.

One category of buffer overflow, sometimes called stack-based buffer overflow, involves overwriting stack memory, sometimes called the stack. Stack-based buffer overflow is typically caused by programs that do not verify the length of the data being copied into a buffer.

When the data exceeds the size of the buffer, the extra data can overflow into the adjacent memory locations. In this manner, it is possible to corrupt valid data and possibly to change the execution flow and instructions.

In the case of a Return-to-LIBC attack, the attacker overflows the stack in such a way that a return address will be replaced to point to a library function in a loaded library inside the process address space. Thus, when the return address is used by the overflowed process, a library function will be executed. This way the attacker runs at least one application programming interface (API) to run a command shell on the compromised system remotely.

SUMMARY OF THE INVENTION

A method includes stalling a call to a critical operating system (OS) function, looking up a value at the previous top of stack, and determining whether the value is equivalent to an address of the critical OS function being called. If the value at the previous top of stack is equivalent to the address of the critical OS function being called, the method further includes taking protective action to protect a computer system.

In one embodiment, if the value at the previous top of stack is equivalent to the address of the critical OS function being called, a determination is made that the critical OS function is being called via a RET (return) instruction as part of a Return-to-LIBC attack. By taking protective action such as terminating the critical OS function call, the Return-to-LIBC attack is blocked and defeated.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

Figure 6:
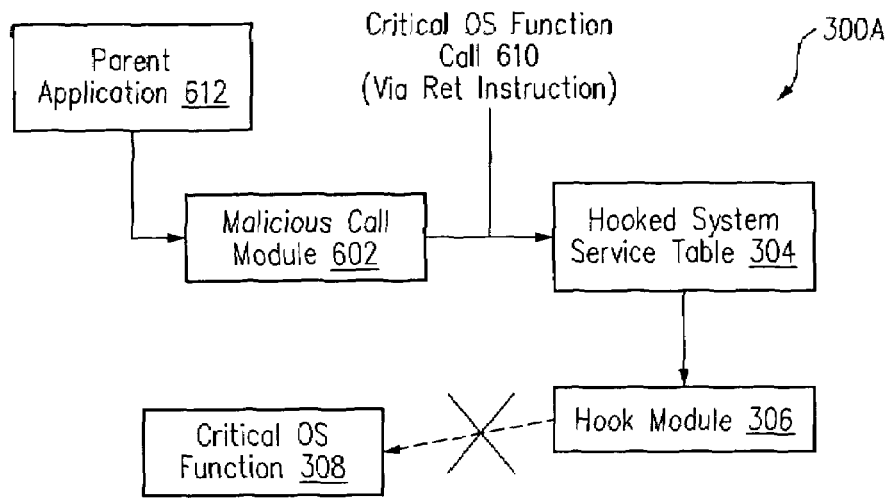
FIG. 6 is a diagram of a hooked operating system function call flow in accordance with another embodiment of the present invention.
Figure 7:
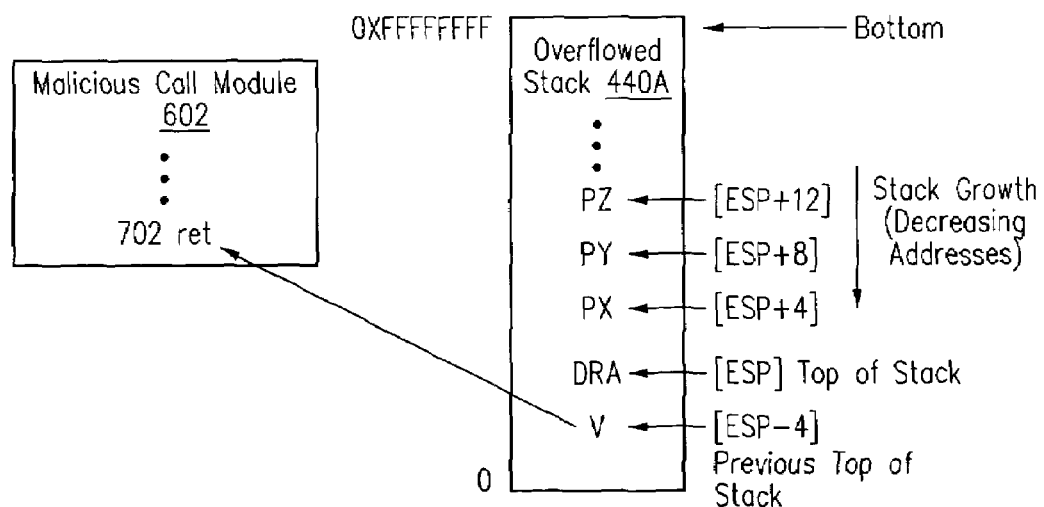
FIG. 7 is a pseudocode representation of an overflowed stack at the instant when a critical OS function call is made in accordance with another embodiment of the present invention.

In accordance with one embodiment, referring to FIGS. 6 and 7, a method includes stalling a call 610 to a critical operating system (OS) function 308, looking up a value V at the previous top of stack at address [ESP-4], and determining whether the value V is equivalent to an address of critical OS function 308. If the value V is equivalent to the address of critical OS function 308, the method further includes taking protective action such as terminating call 610.

In one embodiment, if the value V is equivalent to the address of critical OS function 308, a determination is made that critical OS function 308 is being called via a RET (return) instruction 702 as part of a Return-to-LIBC attack. By taking protective action such as terminating call 610, the Return-to-LIBC attack is blocked and defeated.

Figure 1:
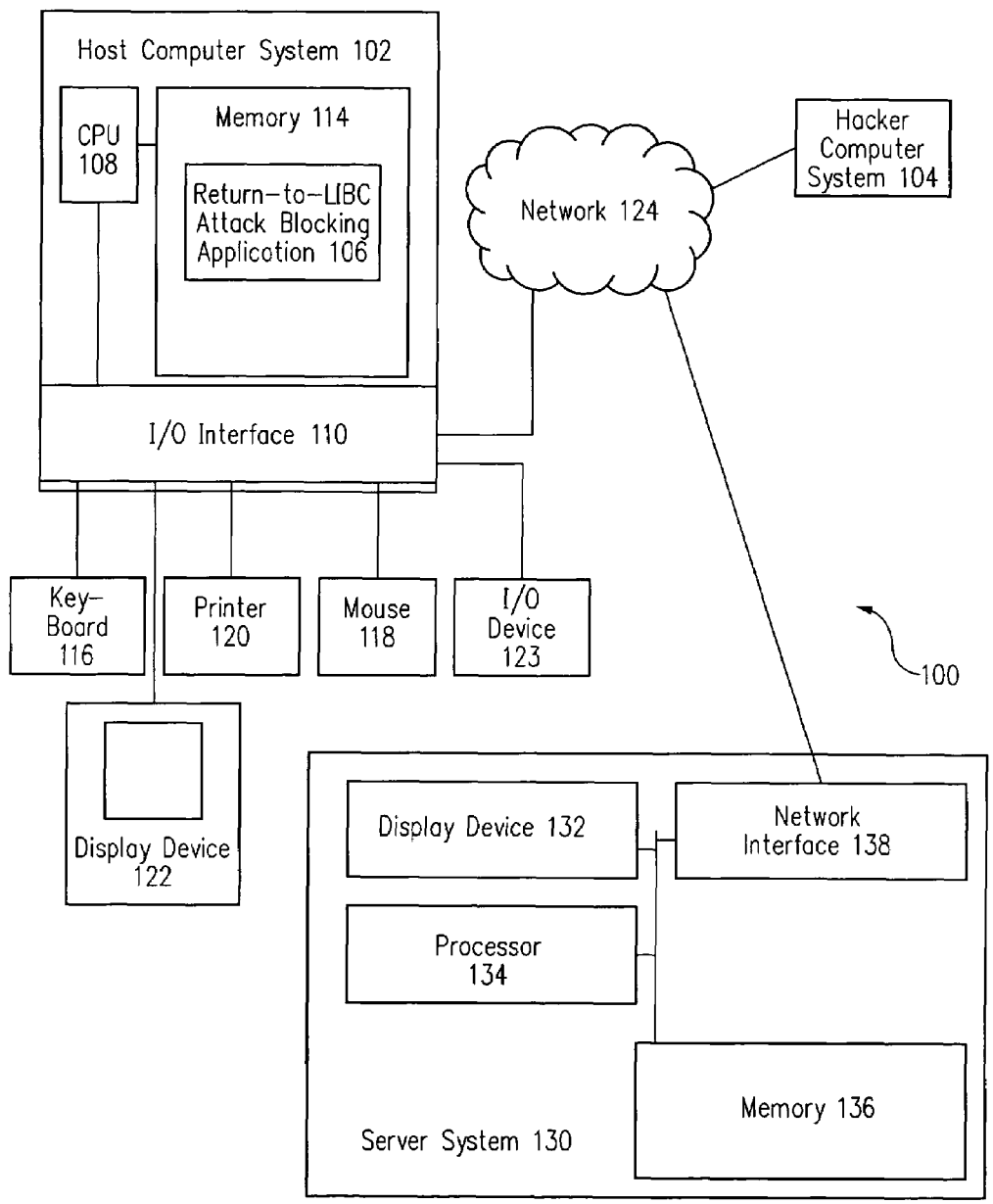
FIG. 1 is a diagram of a client-server system that includes a Return-to-LIBC attack blocking application executing on a host computer system in accordance with one embodiment of the present invention.

More particularly, FIG. 1 is a diagram of a client-server system 100 that includes a Return-to-LIBC attack blocking application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. In one embodiment, memory 114 includes a page based virtual memory system that uses pages, e.g., memory areas.

For example, Windows® NT and Windows® 2000 are 32-bit operating systems widely used on home and business computer systems. Windows® NT and Windows® 2000 provide page-based virtual memory management schemes that permit programs to realize a 4GB (gigabyte) virtual memory address space. In one embodiment, when processor 108 is running in virtual memory mode, all addresses are assumed to be virtual addresses and are translated, or mapped, to physical addresses each time processor 108 executes a new instruction to access memory.

Conventionally, the 4GB virtual memory address space is divided into two parts: a lower 2GB user address space, also referred to as user mode address space or ring 3, available for use by a program; and, a high 2GB system address space, also referred to as kernel address space or ring 0, reserved for use by the operating system.

To protect the integrity of the operating system code and other kernel address space code and data structures from errant or malicious programs and to provide efficient system security (user rights management), Windows® NT and Windows® 2000 separate code executing in the user address space, e.g., user mode, from code executing in the kernel address space, e.g., kernel mode. User mode code typically does not have direct access to kernel mode code and has restricted access to computer system resources and hardware. To utilize kernel mode code functionalities, such as access to disk drives and network connections, user mode programs utilize system calls, sometimes called operating system (OS) function calls or APIs, that interface between the user mode and kernel mode functions.

Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, Return-to-LIBC attack blocking application 106 is loaded into host computer system 102 via I/O device 123, such as from a CD, DVD or floppy disk containing Return-to-LIBC attack blocking application 106.

Host computer system 102 is coupled to a server system 130 of client-server system 100 by a network 124. Server system 130 typically includes a display device 132, a processor 134, a memory 136, and a network interface 138.

Further, host computer system 102 is also coupled to a hacker computer system 104 of client-server system 100 by network 124. In one embodiment, hacker computer system 104 is similar to host computer system 102, for example, includes a central processing unit, an input output (I/O) interface, and a memory. Hacker computer system 104 may further include standard devices like a keyboard, a mouse, a printer, a display device and an I/O device(s). The various hardware components of hacker computer system 104 are not illustrated to avoid detracting from the principals of the invention.

Network 124 can be any network or network system that is of interest to a user. In various embodiments, network interface 138 and I/O interface 110 include analog modems, digital modems, or a network interface card.

Return-to-LIBC attack blocking application 106 is stored in memory 114 of host computer system 102 and executed on host computer system 102. The particular type of and configuration of host computer system 102, hacker computer system 104, and server system 130 are not essential to this embodiment of the present invention.

Figure 2:
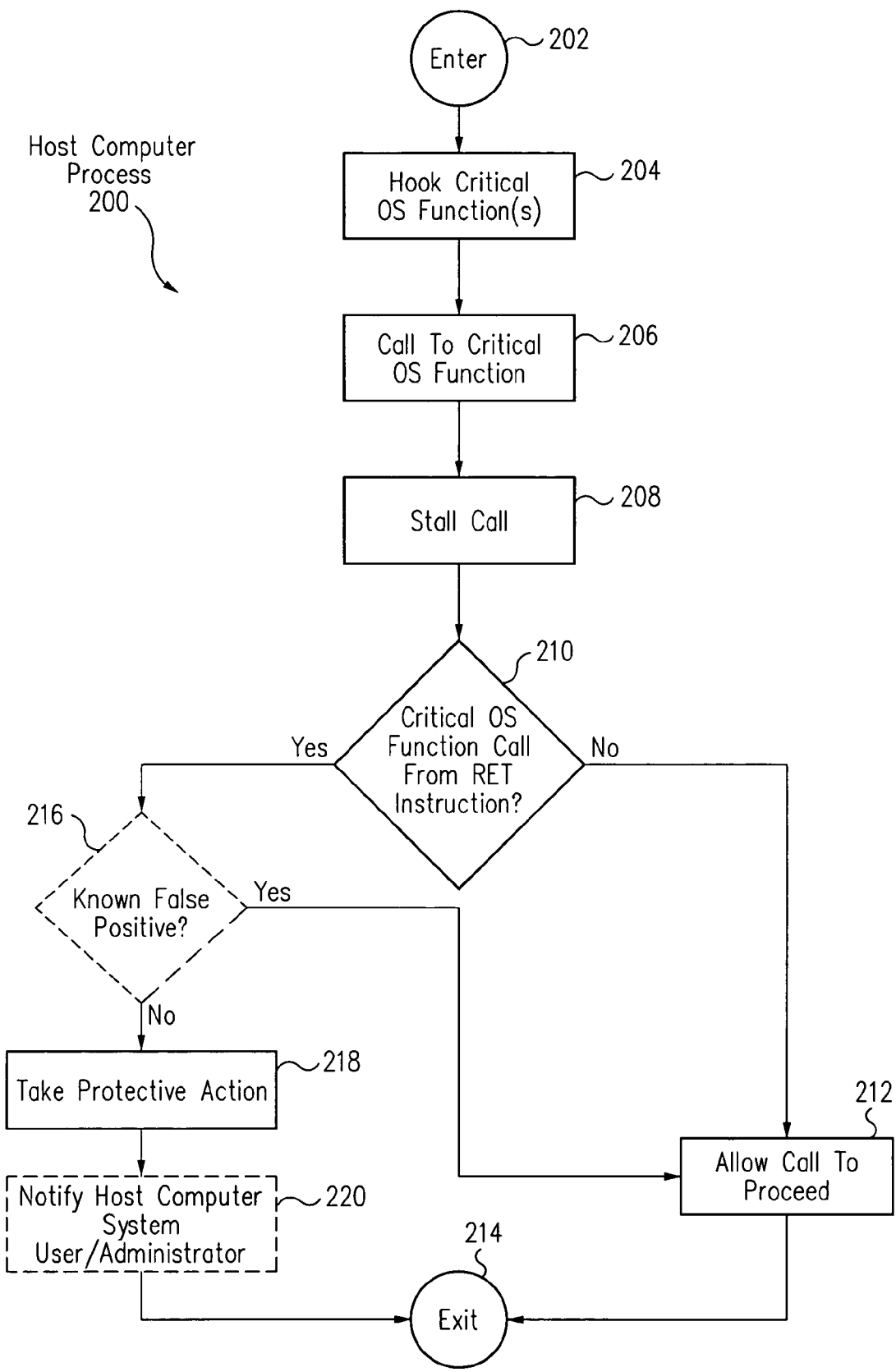
FIG. 2 is a flow diagram of a host computer process in accordance with one embodiment of the present invention.

FIG. 2 is a flow diagram of a host computer process 200 in accordance with one embodiment of the present invention. Referring now to FIGS. 1 and 2 together, execution of Return-to-LIBC attack blocking application 106 by processor 108 results in the operations of host computer process 200 as described below in one embodiment.

From an enter operation 202, flow moves to a hook critical operating system (OS) function(s) operation 204. In hook critical OS function(s) operation 204, the critical operating system functions, e.g., at least one critical operating system function, of host computer system 102 are hooked. In one embodiment, a system level, e.g., a kernel mode module or kernel mode driver, hooks the critical operating system functions. Further, in one embodiment, an operating system function is hooked by redirecting calls to the operating system function, for example, to a hook module in accordance with the present invention.

In one embodiment, an operating system function is critical if it is necessary for a first application, e.g., a parent application, to cause execution of a second application, e.g., a child application. In one particular embodiment, an operating system function is critical if it is necessary or likely to be used by a malicious parent application, e.g., an application which contains or uses malicious code, e.g., located on the stack, to execute a child application, where the child application allows remote access, e.g., remote system level access. Examples of child applications include the command prompt or "cmd.exe" on a Windows® operating system and "/bin/sh" on a UNIX or UNIX like, e.g., FreeBSD or MacOS x, operating system. As used herein, a child application is not dependent upon a parent application, i.e., once the child application is executed the parent application can be terminated without termination of the child application.

In one embodiment, on a Windows® operating system, the CreateProcess() and System() are critical OS functions. In yet another embodiment, critical OS functions are located in the C-library hence the name "Return-to-LIBC" attack.

As is well known to those of skill in the art, system calls expose all kernel functionality that user-mode programs require. User-mode programs need to utilize the functionality provided by the kernel, for example, to access disk drives, network connections, and shared memory. More particularly, because the processor prevents direct access to kernel mode functions by user-mode programs, user-mode programs use system calls, which form the only permitted interface between user-mode and kernel mode. In accordance with one embodiment, system calls include critical OS function calls and non-critical OS function calls.

From hook critical OS function(s) operation 204, flow moves to a call to critical OS function operation 206. In call to critical OS function operation 206, a call, sometimes called a critical OS function call, to a critical OS function is made by a call module of a parent application. The parent application may be malicious or non-malicious. More particularly, a critical OS function call is made by a call module of a parent application to an OS function that was hooked in hook critical OS function(s) operation 204.

In accordance with one embodiment of the present invention, a call module includes the critical OS function call instruction(s), i.e., the instruction or set of instructions that originates the critical OS function call. The call module may be malicious or non-malicious. The parent application includes the call module, or, in one embodiment, the parent application is the call module.

For example, system calls are originated by execution of a CALL instruction or a RET instruction (in the case of a Return-to-LIBC attack). In one embodiment, a CALL instruction is used to divert execution to a particular function. A RET instruction, sometimes called a return instruction, is used to return from a subroutine or marks the end of a main function.

From call to critical OS function operation 206, flow moves to a stall call operation 208. In stall call operation 208, the critical OS function call of operation 206 to the critical OS function is stalled, i.e., is prevented from reaching the operating system. By stalling the critical OS function call, execution of the critical OS function is stalled.

From stall call operation 208, flow moves to a critical OS function call from RET instruction check operation 210. In check operation 210, a determination is made as to whether the critical OS function call originated from execution of a RET instruction. If a determination is made in check operation 210 that the critical OS function call did not originate from execution of a RET instruction, flow moves to an allow call to proceed operation 212.

In allow call to proceed operation 212, the critical OS function call is allowed to proceed. More particularly, the critical OS function call is passed to the operating system.

As discussed above, the critical OS function call was stalled in stall call operation 208. From allow call to proceed operation 212, flow moves to and exits at an exit operation 214 or waits for the next critical OS function call and returns to operation 206.

In a typical Return-to-LIBC attack, a return address is replaced with a malicious return address pointing to a library function in a loaded library, e.g., the C-library, inside the process address space by exploiting a buffer overflow. Thus, when the malicious return address is used by the RET instruction of the call module, a critical OS function call is made. Thus, because a determination is made that the critical OS function call did not originate from execution of a RET instruction in check operation 210, the likelihood that the call module is malicious code is minimal. In one embodiment, malicious code is defined as any computer program, module, set of modules, or code that enters a computer system without an authorized user's knowledge and/or without an authorized user's consent.

However, if a determination is made in check operation 210 that the critical OS function call did originate from execution of a RET instruction, flow moves, optionally, to a known false positive check operation 216 (or directly to a take protective action operation 218 if known false positive check operation 216 is not performed).

In known false positive check operation 216, a determination is made as to whether the critical OS function call is a known false positive. A known false positive critical OS function call is a critical OS function call that originates from execution of a RET instruction but is, in fact, safe, i.e., is not associated with malicious code. An example of a known false positive critical OS function call is the case when non malicious code pushes an OS function address on to the stack and then transfers control to the OS function via a RET instruction. Illustratively, a user-defined or downloadable exclusion and/or inclusion list is used to determine whether the critical OS function call is a known false positive.

If a determination is made in check operation 216 that the critical OS function call is a known false positive critical OS function call, flow moves to allow call to proceed operation 212, which is performed as discussed above. Conversely, if a determination is made in check operation 216 that the critical OS function call is not a known false positive critical OS function call, flow moves to a take protective action operation 218.

In take protective action operation 218, protective action is taken to prevent the malicious code of or used by the call module from causing damage to or exploiting host computer system 102. For example, the critical OS function call is terminated. More particularly, the critical OS function call is not passed to the operating system but is terminated. As discussed above, the critical OS function call was stalled in stall call operation 208.

By terminating the critical OS function call, the malicious code of the call module is prevented from exploiting and/or damaging host computer system 102. In one embodiment, by terminating the critical OS function call, the child application is prevented from being executed. By preventing execution of the child application, remote access is denied thus preventing unauthorized access by malicious hackers as well as by replicating malware, e.g., worms.

In one embodiment, because a determination is made in check operation 210 that the critical OS function call did originate from execution of a RET instruction, the likelihood that the call module is malicious code is significant. However, by terminating the critical OS function call, the critical OS function is prevented from being execution. By preventing execution of the critical OS function, remote access is denied, thus preventing unauthorized access by malicious hackers and also by replicating malware, e.g., worms.

As another example of protective action, the parent application including the call module and/or a malicious thread running within the context of the parent application is terminated. Termination of applications is well known to those of skill in the art and so is not discussed further for clarity of discussion.

Flow moves from take protective action operation 218, optionally, to a notify host computer system user/administrator operation 220 (or directly to exit operation 214 if operation 220 is not performed). In notify host computer system user/administrator operation 220, the user of host computer system 102 and/or the administrator are notified that protective action has been taken on host computer system 102, e.g., that a call, a parent application and/or a call module have been terminated. The user and/or administrator can be notified using any one of a number of techniques, e.g., by using a pop up window, by writing to a file and/or otherwise by logging the event. Further, a notification can be provided to a security center.

From notify host computer system user/administrator operation 220, flow moves to and exits at exit operation 214 or waits for the next critical OS function call and returns to operation 206.

Figure 3:
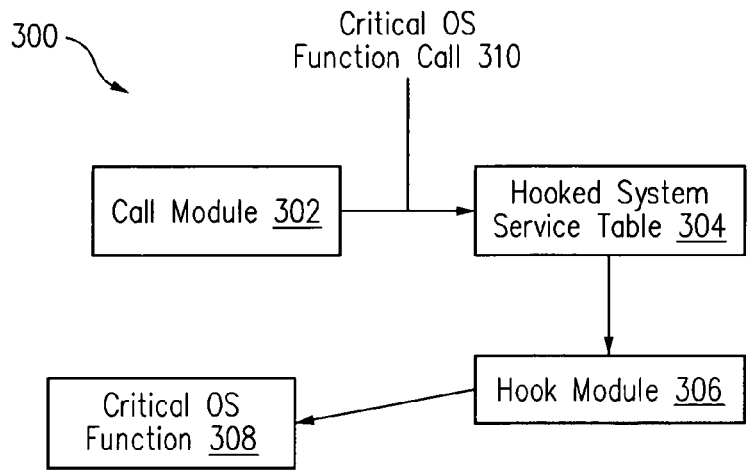
FIG. 3 is a diagram of a hooked operating system function call flow in accordance with one embodiment of the present invention.

FIG. 3 is a diagram of a hooked operating system function call flow 300 in accordance with one embodiment of the present invention. Referring now to FIGS. 2 and 3 together, a hook module 306 is used to hook calls to a critical OS function 308. In one embodiment, hook critical OS function(s) operation 204 is implemented using hook module 306, which is part of Return-to-LIBC blocking application 106 (FIG. 1).

More particularly, a hooked system service table 304 routes noncritical OS function calls directly to the operating system (not shown). However, hooked system service table 304 routes critical OS function calls to hook module 306, e.g., a kernel mode module or kernel mode driver.

As is well known to those of skill in the art, a system service table, sometimes called a dispatch table or a system call table, relates system calls to specific addresses within the operating system kernel. Hooked system service table 304 in accordance with one embodiment of the present invention, redirects critical OS function calls to hook module 306 and from the specific addresses within the operating system kernel to which the critical OS function calls would otherwise be directed.

Although FIG. 3 describes one example of a hooked operating system function call path, in light of this disclosure, those of skill in the art will understand that other techniques can be used to hook operating system function(s). The particular technique used depends, for example, on the particular operating system.

In one embodiment, hook module 306 is used to stall a critical OS function call during stall call operation 208 of FIG. 2. Further, hook module 306 continues to stall the critical OS function call during critical OS function call from RET instruction check operation 210 (and known false positive check operation 216 if performed). Hook module 306 allows the critical OS function call to proceed to the operating system and thus to critical OS function 308 during allow call to proceed operation 212. Conversely, hook module 306 terminates the critical OS function call and/or takes other protective action during take protective action operation 218.

In accordance with this embodiment, a critical OS function call 310 originates from a call module 302 during call to critical OS function operation 206. Critical OS function call 310 is routed by hooked system service table 304 to hook module 306. Critical OS function call 310 is stalled by hook module 306 in stall call operation 208.

Figure 4:
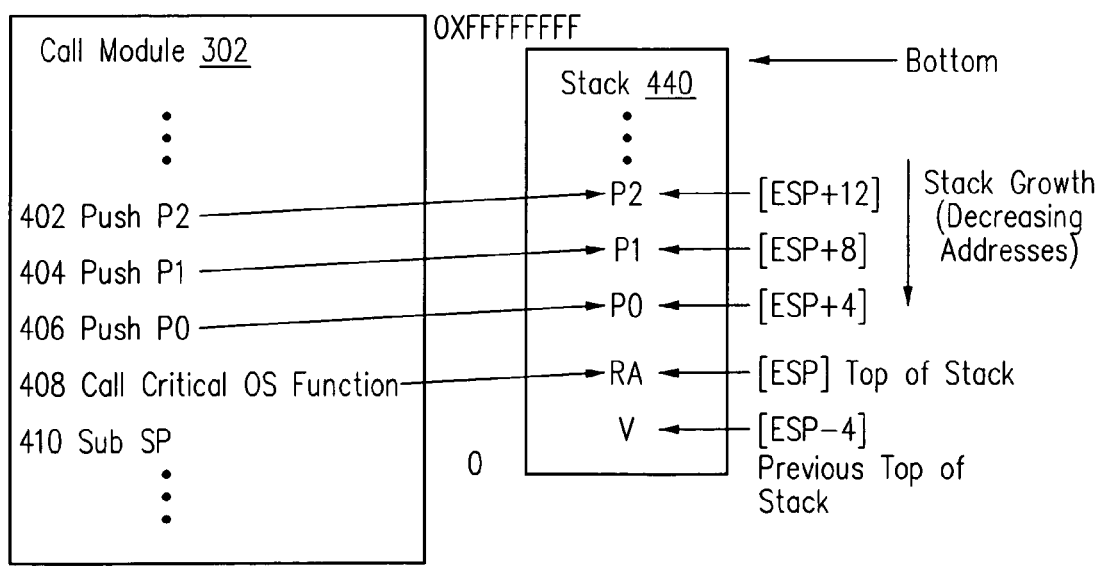
FIG. 4 is a pseudocode representation of a stack at the instant when a critical OS function call is made in accordance with one embodiment of the present invention.

FIG. 4 is a pseudocode representation of a stack 440 at the instant when critical OS function call 310 is made in accordance with one embodiment of the present invention. In one embodiment, stack 440 is part of memory 114 (FIG. 1). Illustratively, stack 440 is an area of dwords (32 bit data areas) in memory 114 which applications use to store data temporarily.

The register ESP, i.e., the extended stack pointer, holds the top of the stack. More particularly, the register ESP holds a value, sometimes called the stack pointer, that is the address of the top of the stack. Accordingly, the address of the top of the stack is sometimes called address [ESP]. The top of the stack is the address where instructions that use the stack, e.g., PUSH, POP, CALL and RET instructions, actually use the stack. The operation and use of stacks, stack pointers, and the top of the stack are well known to those of skill in the art. Note that the bottom of the stack is the uppermost area of stack 440 in the view of FIG. 4, i.e., the top of stack 440 is down in the view of FIG. 4 and the bottom of stack 440 is up in the view of FIG. 4. Generally, the addresses in stack 440 decrease towards the top of the stack, i.e., the addresses decrease going down in the view of FIG. 4.

Referring now to FIGS. 3 and 4 together, to originate critical OS function call 310, call module 302 executes instructions 402, 404, 406, and 408. More particularly, call module 302 includes instructions 402, 404 and 406 that push parameter P2, parameter P1, and parameter P0, respectively, on to stack 440. Call module 302 further includes an instruction 408 that calls a critical OS function and an instruction 410 that decrements the stack pointer for cleanup of stack 440 as those of skill in the art will understand.

Execution of instructions 402, 404 and 406 push parameter P2, parameter P1, and parameter P0, respectively, on to stack 440 as shown by the arrows. Execution of instruction 408 causes critical OS function call 310 to be made and pushes the return address RA to which the critical OS function is to return, e.g., the address of instruction 410, on to stack 440 as shown by the arrow.

Accordingly, when critical OS function call 310 is made by call module 302, the top of the stack at address [ESP] contains the return address RA. The previous top of stack, sometimes called the previous DWORD, contains a value V typically unrelated to critical OS function call 310. In one embodiment, the previous top of stack is the memory address at which the last (most recent) value from the stack was popped, i.e., read. The value, sometimes called data, in the previous top of the stack is still there because the value is just read from the stack when it is popped and not overwritten. In one embodiment, the previous top of the stack is at address [ESP-4], i.e., the stack pointer minus 4 bytes.

Figure 5:
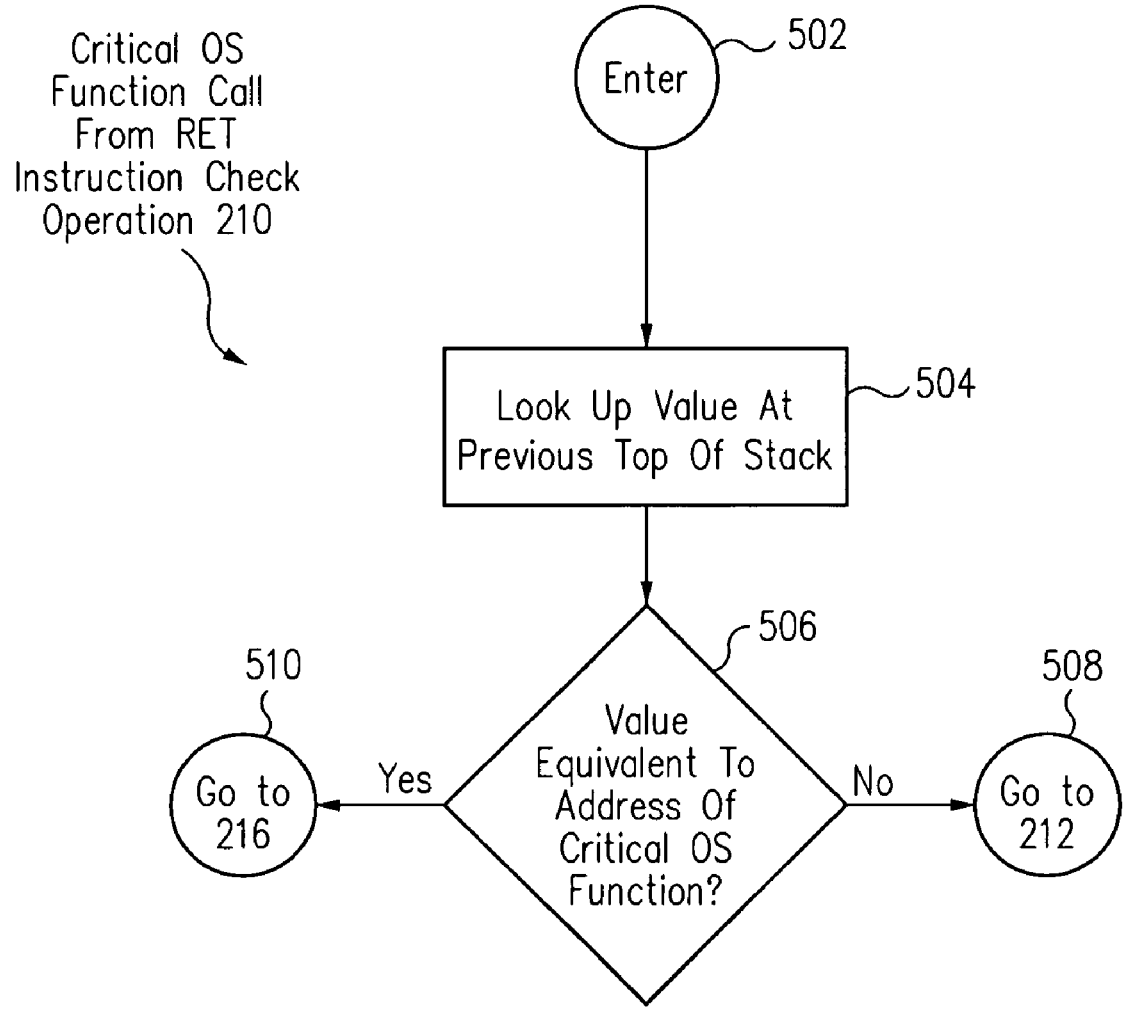
FIG. 5 is a flow diagram of a critical OS function call from RET instruction check operation of the host computer process of FIG. 2 in accordance with one embodiment of the present invention.

FIG. 5 is a flow diagram of critical OS function call from RET instruction check operation 210 of host computer process 200 of FIG. 2 in accordance with one embodiment of the present invention. Referring now to FIGS. 2, 3, 4 and 5 together, from an enter operation 502 (and from stall call operation 208 of FIG. 2), flow moves to a look up value at previous top of stack operation 504. In look up value at previous top of stack operation 504, the value V at the previous top of stack at address [ESP-4] is determined, e.g., read. Reading values from stack addresses is well known to those of skill in the art. From look up value at previous top of stack operation 504, flow moves to a value equivalent to address of critical OS function check operation 506.

In check operation 506, a determination is made as to whether the value V at the previous top of stack at address [ESP-4] determined in operation 504 is equivalent, and in one embodiment, exactly equal, to the address of the critical OS function being called. In accordance with this embodiment, critical OS function call 310 is a call to critical OS function 308, which is located at a particular address in memory 114 (FIG. 1). The particular address of critical OS function 308 is obtained using any one of a number of techniques well known to those of skill in the art and the particular technique used is not essential to the present invention.

As discussed above, the previous top of stack at address [ESP-4] contains a value V typically unrelated to critical OS function call 310 and, specifically, unrelated to the address of critical OS function 308. Accordingly, in this embodiment where call module 302 is not malicious, a determination is made in check operation 506 that the value at the previous top of stack at address [ESP-4] is not equivalent to the address of critical OS function 308. Accordingly, flow moves to allow call to proceed operation 212 through operation 508.

FIG. 6 is a diagram of a hooked operating system function call flow 300A in accordance with another embodiment of the present invention. Referring now to FIGS. 2 and 6, hook module 306 is used to hook calls to critical OS function 308 routed from hooked system service table 304 as discussed above in reference to FIG. 3, the discussion of which is herein incorporated by reference.

In accordance with this embodiment, a critical OS function call 610 originates from a malicious call module 602 during call to critical OS function operation 206. For example, control is transferred from a parent application 612 to malicious call module 602. As discussed further below, instead of returning control to parent application 612, malicious call module 602 originates critical OS function call 610 by executing a RET instruction using a malicious return address placed on to a stack as a result of a buffer overflow in a typical Return-to-LIBC attack.

Critical OS function call 610 is routed by hooked system service table 304 to hook module 306. Critical OS function call 610 is stalled by hook module 306 in stall call operation 208.

FIG. 7 is a pseudocode representation of an overflowed stack 440A at the instant when critical OS function call 610 is made in accordance with another embodiment of the present invention. Referring now to FIGS. 6 and 7 together, to originate critical OS function call 610, malicious call module 602 executes a RET instruction 702.

More particularly, malicious call module 602 includes RET instruction 702 (FIG. 7) that is used to return control to parent application 612 during normal operation. However, by exploiting a buffer overflow, malicious parameters are loaded into overflowed stack 440A. For example, a buffer overflow is exploited from hacker computer system 104 (FIG. 1).

Specifically, a buffer overflow is exploited to load parameters PZ, PY, PX and a dummy return address DRA into addresses [ESP+12], [ESP+8], [ESP+4], [ESP], respectively, of overflowed stack 440A. Also, the value V, sometimes called a malicious return address, is loaded into address [ESP-4] of overflowed stack 440A during the exploitation of the buffer overflow.

Accordingly, during execution of RET instruction 702 of malicious call module 602, the value V is read, sometimes called popped, from overflowed stack 440A. Accordingly, malicious call module 602 returns to the address specified by value V. As part of the Return-to-LIBC attack, the value V is the address of critical OS function 308. Thus, malicious call module 602 attempts to transfer control to critical OS function 308 by generating critical OS function call 610.

Accordingly, when critical OS function call 610 is made by malicious call module 602, the previous top of stack at address [ESP-4] contains a value V, which is the address of critical OS function 308. Further, the top of the stack at address [ESP] contains dummy return address DRA followed by PX, PY and PZ, which is what critical OS function 308 would expect to see in the stack and thus intentionally placed there during the Return-to-LIBC attack.

Referring now to FIGS. 2, 5, 6 and 7 together, from enter operation 502 (and from stall call operation 208 of FIG. 2), flow moves to look up value at previous top of stack operation 504. In operation 504, the value V at the previous top of stack at address [ESP-4], i.e., the address of critical OS function 308, is determined. From operation 504, flow moves to value equivalent to address of critical OS function check operation 506.

In check operation 506, a determination is made that the value V at the previous top of stack at address [ESP-4] determined in operation 504 is equivalent to the address of the critical OS function being called.

Accordingly, in this embodiment where malicious call module 602 is malicious, a determination is made in check operation 506 that the value at the previous top of stack at address [ESP-4] is equivalent to the address of critical OS function 308. Accordingly, flow moves to known false positive check operation 216 (or directly to take protective action operation 218 if known false positive check operation 216 is not performed) through operation 510.

After a determination that critical OS function call 610 is not a known false positive in check operation 216, protective action is taken in take protective action operation 218.

Illustratively, hook module 306 terminates critical OS function call 610. By terminating critical OS function call 610, execution of critical OS function 308 is prevented. This, in turn, denies remote access thus preventing unauthorized access to host computer system 102 by malicious hackers and also by replicating malware, e.g., worms.

Optionally, operation 220 is performed as discussed above and flow exits at exit operation 214.

Referring again to FIG. 1, Return-to-LIBC attack blocking application 106 is in computer memory 114. As used herein, a computer memory refers to a volatile memory, a non-volatile memory, or a combination of the two.

Although Return-to-LIBC attack blocking application 106 is referred to as an application, this is illustrative only. Return-to-LIBC attack blocking application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, Return-to-LIBC attack blocking application 106 is implemented as a system level, e.g., kernel mode driver.

While embodiments in accordance with the present invention have been described for a client-server configuration, an embodiment of the present invention may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, Return-to-LIBC attack blocking application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the Return-to-LIBC attack blocking functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the Return-to-LIBC attack blocking functionality in accordance with one embodiment of present invention can be implemented in a wide variety of computer system configurations. In addition, the Return-to-LIBC attack blocking functionality could be stored as different modules in memories of different devices. For example, Return-to-LIBC attack blocking application 106 could initially be stored in server system 130, and then as necessary, a portion of Return-to-LIBC attack blocking application 106 could be transferred to host computer system 102 and executed on host computer system 102. Consequently, part of the Return-to-LIBC attack blocking functionality would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, Return-to-LIBC attack blocking application 106 is stored in memory 136 of server system 130. Return-to-LIBC attack blocking application 106 is transferred over network 124 to memory 114 in host computer system 102. In this embodiment, network interface 138 and I/O interface 110 would include analog modems, digital modems, or a network interface card. If modems are used, network 124 includes a communications network, and Return-to-LIBC attack blocking application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:

stalling a call to a critical operating system (OS) function; and determining whether said call is from execution of a return instruction comprising:

looking up a value at a previous top of stack; and determining whether said value is equivalent to an address of said critical OS function, wherein upon a determination that said call is from execution of said return instruction during said determining, said method further comprising taking protective action to protect a computer system.

2. The method of claim 1 wherein a determination is made that said call is from execution of a return instruction when a determination is made that said value is equivalent to said address of said critical OS function.

3. The method of claim 1 wherein a determination is made that said call is not from execution of a return instruction when a determination is made that said value is not equivalent to said address of said critical OS function.

4. The method of claim 1 further comprising allowing said call to proceed upon a determination that said value is not equivalent to said address of said critical OS function.

5. The method of claim 1 wherein said previous top of stack is at address [ESP-4].

6. The method of claim 5 wherein a top of stack is at address [ESP].

7. The method of claim 1 wherein said taking protective action comprises terminating said call.

8. The method of claim 1 wherein said taking protective action comprises terminating a call module originating said call.

9. The method of claim 1 wherein said taking protective action comprises terminating a parent application comprising a call module originating said call.

10. The method of claim 1 further comprising providing a notification that said protective action has been taken.

11. The method of claim 1 wherein upon a determination that said call is from execution of said return instruction during said determining, said method further comprising determining whether said call is a known false positive.

12. The method of claim 11 wherein upon a determination that said call is not said known false positive, said taking protective action to protect a computer system is performed.

13. The method of claim 11 wherein upon a determination that said call is said known false positive, said method further comprising allowing said call to proceed.

14. The method of claim 1 further comprising providing a notification that said protective action has been taken.

15. The method of claim 1 further comprising hooking said critical OS function.

16. The method of claim 1 further comprising originating said call to said critical OS function.

17. The method of claim 1 wherein said critical OS function is necessary for a first application to cause execution of a second application.

18. The method of claim 17 wherein said second application allows remote access of a computer system.

19. A method comprising:

stalling a call to a critical operating system (OS) function;

looking up a value at a previous top of stack; and determining whether said value is equivalent to an address of said critical OS function, wherein upon a determination that said value is equivalent to said address of said critical OS function, said method further comprising taking protective action to protect a computer system.

20. The method of claim 19 wherein upon a determination that said value is not equivalent to said address of said critical OS function, said method further comprising allowing said call to proceed.

21. A computer program product comprising a tangible computer readable medium containing computer program code comprising:

a Return-to-LIBC attack blocking application for stalling a call to a critical operating system (OS) function;

said Return-to-LIBC attack blocking application further for looking up a value at a previous top of stack; and said Return-to-LIBC attack blocking application further for determining whether said value is equivalent to an address of said critical OS function, wherein upon a determination that said value is equivalent to said address of said critical OS function, said Return-to-LIBC attack blocking application further for taking protective action to protect a computer system comprising said Return-to-LIBC attack blocking application.

* * * * *